P. MURPHY.
Stereoscope.
No. 161,054.  Patented March 23, 1875.
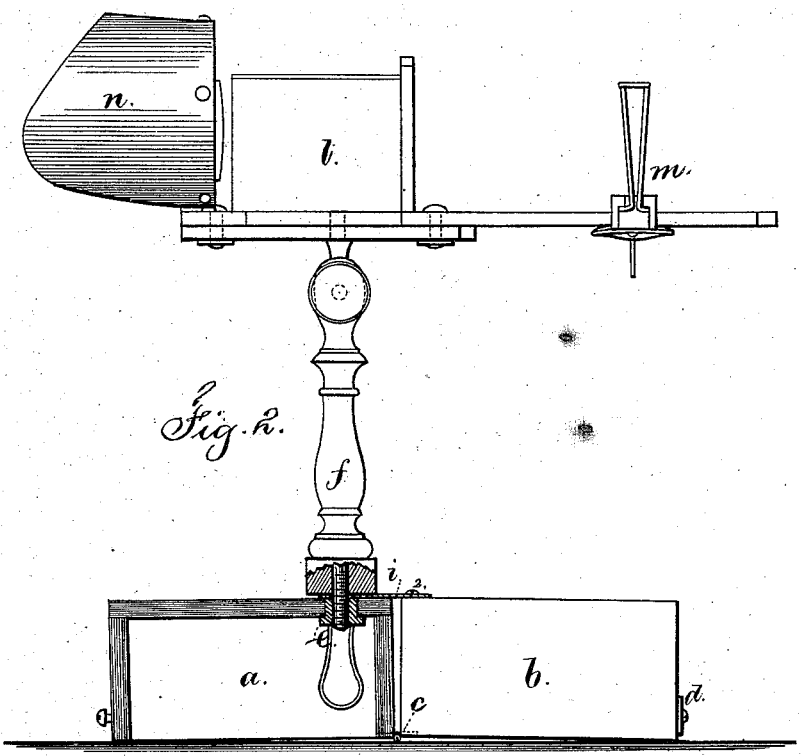
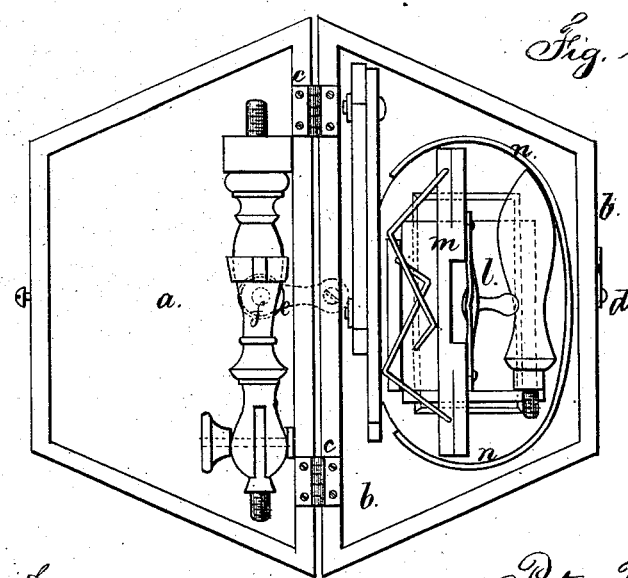

UNITED STATES PATENT OFFICE.

PETER MURPHY, OF JERSEY CITY, NEW JERSEY.

IMPROVEMENT IN STEREOSCOPES.

Specification forming part of Letters Patent No. 161,054, dated March 23, 1875; application filed August 6, 1874.

*To all whom it may concern:*

Be it known that I, PETER MURPHY, of Jersey City, in the county of Hudson and State of New Jersey, have invented an Improvement in Stereoscope Instruments, of which the following is a specification:

Folding stereoscopes have been so constructed that they occupy but little space in transportation. An instrument of this character may be seen in my patent of February 25, 1873, No. 136,333.

Stereoscopes of this kind are usually placed in a box. I construct the box so that it becomes a base for the column that is used to support the instrument.

In the drawing, Figure 1 is a plan of the box open, with the stereoscope in it and folded for transportation; and Fig. 2 is a side view of the instrument, with the base formed by the box partially in section.

The box into which the folded stereoscope is inserted is shown as made of the two parts $a$ $b$, hinged together at $c$ and provided with a hook or fastening at $d$ and with a métallic nut, $e$, into which is screwed the base of the column $f$, as shown in Fig. 2. The link $i$ is attached permanently at one end, by the rivet or screw 2, to the portion $b$ of the box, and the other end is made as an open eye, so that when the box is opened the link can be swung around into the position shown in Fig. 2, and the screw of the column inserted through this eye and the link clamped by screwing the column into place. Thereby the parts of the box are held together firmly when used as a base for the column.

The stereoscope is made to fold sufficiently for insertion into the box. I have represented the dividing-plate $l$ as movable and held by the upper screw end of the column, and the slide $m$ as jointed so as to fold as described in my aforesaid patent.

The hood $n$ is made of horn, a thin sheet thereof being attached around the edges of the frame holding the lenses, and this hood extends at right angles, or nearly so, to the lens-holder, and the outer edge is shaped to shield the light and accommodate the general conformation of the face.

I claim as my invention—

The stereoscope holder and stand, consisting of a hinged two-part box opening to form the stand, and provided with the nut $e$ for the screw-standard, and the link $i$ secured by that standard and holding the box open, as set forth.

Signed by me this 31st day of July, A. D. 1874.

PETER MURPHY.

Witnesses:
GEO. T. PINCKNEY,
CHAS. H. SMITH.